3,445,400
CHROMATE CORROSION INHIBITING COMPOSITION CONTAINING SURFACE-ACTIVE AGENTS
Clifford R. Everhart, Pampa, Tex., assignor to Midwest Chemical & Processing Co., Inc., Pampa, Tex., a corporation of Texas
No Drawing. Filed Dec. 27, 1965, Ser. No. 516,766
Int. Cl. C23f 11/10, 11/18
U.S. Cl. 252—389
2 Claims

ABSTRACT OF THE DISCLOSURE

A corrosion inhibiting composition including sodium bichromate, zinc sulfate, sodium nitrite, and sodium lignin sulfonate and sodium lignosulfonate not to exceed 4.8 percent by weight of the composition.

---

The present invention relates generally to an improved corrosion inhibiting composition and more particularly an improved corrosion inhibiting composition suitable for use with well drilling fluids to protect the well drilling equipment.

An object of the present invention is to provide an improved corrosion inhibitor which is suitable for use with drilling fluids in the drilling of wells.

Another object of the present invention is to provide an improved water soluble corrosion inhibitor.

A further object is to provide an improved water soluble chromate-type corrosion inhibitor for use with drilling fluids in the drilling of wells.

Still another object is to provide an improved corrosion inhibiting composition which will lower the corrosion rate of well drilling equipment substantially immediately upon being added to the drilling fluid which is used with such well drilling equipment.

A still further object of the present invention is to provide an improved additive for well drilling fluids which is water soluble and which will inhibit corrosion of the well drilling equipment.

Corrosion in well drilling equipment is a very serious problem. Such corrosion can lead to equipment failure which will be of very considerable greater expense than just the loss of the equipment itself since all of the drilling equipment will have to be removed from the well bore before drilling may be resumed.

Therefore, it is desirable to provide some corrosion inhibition for well drilling operations. Normally, this corrosion inhibition has taken the part of an additive supplied to the drilling fluids or mud which is circulated during the drilling operation. It is, therefore, desirable that the composition of the inhibitor additive be water soluble so that it may be dissolved readily in water-base muds and so that it may be made up as a solution with water for use with other drilling fluids.

Chromates have long been used as additives in an attempt to inhibit corrosion, but such prior use of chromates has not been successful in substantially reducing the corrosion rate in well drilling operations.

The composition of the additive of the present invention will include the following: sodium bichromate in the range of 55 to 65 percent by weight with 60 percent by weight being preferred, zinc sulfate in the range of 25 to 30 percent by weight with 28 percent by weight being preferred, sodium lignin sulfonate in the range of 1.8 to 2.8 percent by weight with 2.4 being preferred, sodium lignosulfonate in the range of 1.4 to 2.0 percent by weight with 1.8 percent by weight being preferred and sodium nitrite in the range of 5 to 9 percent by weight with 7.8 percent by weight being preferred.

The foregoing preferred composition has an appearance of a light orange free-flowing powder. It is readily soluble in water and has a density of 98.4 pounds per cubic foot. The material, when used with drilling fluids, is added to the drilling fluids to provide approximately 120 to 150 parts per million of chromate in solution in the drilling fluid. This amounts to approximately one pound of the composition per twenty barrels of drilling fluid circulation.

While the preferred ratio of chromate in solution in the drilling fluid is as stated above, the ratio should be at least 75 parts per million of chromate in solution in the drilling fluid to achieve corrosion rates which do not exceed the usual maximum allowable rate of 2 mils per year. If higher corrosion rates are allowable, the amount of chromate in solution in the drilling fluid may be adjusted to provide an amount sufficient to limit corrosion to a rate below the maximum allowable rate.

In preparing the composition which is a mixture of the different components above listed, it is believed best to combine the ingredients in a form of finely divided particles or powder. The sodium bichromate will normally be in crystalline form, and to allow greater solubility, these crystals should be pulverized. It has been found that a slight amount of heat is given off if the sodium bichromate and the sodium nitrite are mixed before adding the zinc sulfate. This heat may be avoided by first combining the zinc sulfate with the sodium bichromate and thereafter adding the other components.

The inhibitive properties of certain chromates have long been known. It is believed that the particular combination of the sodium bichromates and the zinc sulfate provides a climate in which the chromate is allowed to provide a plating for the metal which greatly reduces corrosion. It is thought that possibly this is a result of ionization of the combined solutions of zinc sulfate and sodium bichromate with the chromate ions going to the metal surfaces and there forming a transient type of plating to protect the metal surfaces from corrosion. The sodium lignin sulfonate and the sodium lignosulfonate are surface-active agents. The sodium lignin sulfonate is readily available from Crown Zellerbach Company and is sold under the trademark Orzan L.S. The sodium lignosulfonate is readily available from Marathon Corporation and is sold under the trade name Maracell E. As used herein the terms sodium lignin sulfonate and sodium lignosulfonate are those products as hereinabove set forth wherein the sodium lignosulfonate has approximately eighty percent of the sulfonic groups replaced with hydroxyl groups and the phenolic hydroxyl content has been increased about three-fold over the content of the sodium lignin sulfonate. The sodium lignin sulfonate is commonly termed spent sulfite liquor lignosulfonate. It is believed that these two components act in a manner to prepare the surface for the transient chromate plating by their surface-active properties. The sodium nitrite is believed to be acting as a catalyst. It is also believed that the sodium nitrite exhibits some corrosion inhibiting characteristics in and of itself.

While the foregoing is believed to be a correct analysis of the action of the components of the inhibiting additive composition of the present invention, it is known that the composition will almost immediately upon addition to drilling fluids begin to inhibit corrosion.

Tests have been run with drilling fluids, such as drilling mud, in which two strips, one of mild carbon steel and one of admiralty brass, are connected in a circuit with an ammeter, and such strips are immersed in a mud tank. It has been found in relation to such tests that a reading of thirty microamps will approximate a corrosion rate of 1 mil per year. One particular example of the effectiveness of the composition of the present invention in inhibiting corrosion was tested with the aforementioned apparatus. Prior to the addition of the corrosion inhibited composition of the present invention, the two strips were immersed in a mud table and the reading of the ammeter was recorded on a strip chart. This reading corresponding to a corrosion rate of approximately 7.96 mils per year of corrosion. Thereafter, the composition of the present invention was added to the mud in the mud tank. Within forty-eight hours, the recorded corrosion rate had been reduced to 2.2 mils per year. After nine days of continuous use of the composition of the present invention, the corrosion rate was recorded as 0.860 mils per year. Such testing illustrates the effectiveness of the composition of the present invention when added to drilling fluids to prevent corrosion.

It is also believed possible that the transient plating action of chromate on metal surfaces possibly could provide some protection for the metal surfaces from erosion due to the circulation of fluids across the metal surfaces.

From the foregoing it can be seen that the improved composition of the present invention provides the inhibition of corrosion of metal surfaces with particular application to protection of the metal surfaces involved in the drilling of wells. The composition of the present invention is water soluble and is readily used with all types of drilling fluids to greatly reduce the corrosion rate.

What is claimed is:
1. A corrosion inhibiting composition consisting essentially of,
   sodium bichromate in the range of 55 to 65 percent by weight,
   zinc sulfate in the range of 25 to 30 percent by weight,
   sodium lignin sulfonate in the range of 1.8 to 2.8 percent by weight,
   sodium lignosulfonate in the range of 1.4 to 2.0 percent by weight, and
   sodium nitrite in the range of 5 to 9 percent by weight.
2. A corrosion inhibiting composition essentially of approximately
   60 percent by weight sodium bichromate,
   28 percent by weight zinc sulfate,
   2.4 percent by weight sodium lignin sulfonate,
   1.8 percent by weight sodium lignosulfonate, and
   7.8 percent by weight sodium nitrite.

References Cited
UNITED STATES PATENTS

| | | | |
|---|---|---|---|
| 2,605,221 | 7/1952 | Hoeppel | 252—8.5 |
| 2,777,818 | 1/1957 | Gambill | 252—181 X |
| 2,795,560 | 6/1957 | Williams | 252—387 |
| 2,858,271 | 10/1958 | Byrd | 252—8.5 |
| 2,868,726 | 1/1959 | Brukner et al. | 252—8.5 |
| 3,024,201 | 3/1962 | Bregman | 252—387 |
| 3,171,811 | 3/1965 | Keirstead | 252—8.5 |
| 3,173,864 | 3/1965 | Freedman | 252—181 X |

OTHER REFERENCES

The condensed Chemical Dictionary, Reinhold, 1961, p. 666.

LEON D. ROSDOL, *Primary Examiner*.

I. GLUCK, *Assistant Examiner*.

U.S. Cl. X.R.

21—2.7; 252—85, 175, 181, 387